US008285244B2

(12) United States Patent
Girard et al.

(10) Patent No.: US 8,285,244 B2
(45) Date of Patent: Oct. 9, 2012

(54) UNIFORM EMERGENCY INTERCONNECT ACCESS IN A MULTI-MODAL DEVICE

(75) Inventors: Joann K. Girard, Coconut Creek, FL (US); Robert H. Pichette, Plantation, FL (US); WenJiong Yang, Boca Raton, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1035 days.

(21) Appl. No.: 11/535,352

(22) Filed: Sep. 26, 2006

(65) Prior Publication Data

US 2008/0076382 A1 Mar. 27, 2008

(51) Int. Cl.
*H04M 11/04* (2006.01)
*G06F 3/14* (2006.01)

(52) U.S. Cl. .................. 455/404.1; 455/404.2; 715/864; 379/37; 379/45

(58) Field of Classification Search .................. 455/404, 455/456.1, 521; 379/37, 209.01, 45; 715/864
See application file for complete search history.

(56) References Cited

U.S. PATENT DOCUMENTS

| | | | |
|---|---|---|---|
| 5,602,901 A | 2/1997 | Redden et al. | |
| 5,742,904 A | 4/1998 | Pinder et al. | |
| 6,011,510 A | 1/2000 | Yee et al. | |
| 6,038,438 A | 3/2000 | Beeson et al. | |
| 6,073,005 A * | 6/2000 | Raith et al. ................ | 455/404.1 |
| 6,115,598 A * | 9/2000 | Yu ............................ | 455/404.1 |
| 6,141,558 A | 10/2000 | Chen | |
| 6,240,285 B1 * | 5/2001 | Blum et al. ................ | 455/404.1 |
| 6,256,497 B1 | 7/2001 | Chambers | |
| 6,314,281 B1 | 11/2001 | Chao et al. | |
| 6,332,073 B1 * | 12/2001 | Nilsson et al. ............ | 455/404.1 |
| 6,370,381 B1 * | 4/2002 | Minnick et al. ............ | 455/445 |
| 6,766,159 B2 * | 7/2004 | Lindholm ................... | 455/404.1 |
| 6,801,762 B1 * | 10/2004 | Huilgol ...................... | 455/404.1 |
| 6,907,238 B2 | 6/2005 | Leung | |
| 6,917,797 B1 | 7/2005 | Hoppa | |
| 7,039,425 B1 * | 5/2006 | Mazawa et al. ............ | 455/456.4 |
| 7,098,787 B2 | 8/2006 | Miller | |
| 7,113,764 B1 * | 9/2006 | Jang et al. .................. | 455/404.1 |
| 7,573,380 B2 | 8/2009 | Pinder | |
| 2002/0077075 A1 | 6/2002 | Ikonen et al. | |
| 2002/0181492 A1 | 12/2002 | Kasami et al. | |
| 2003/0186709 A1 * | 10/2003 | Rhodes et al. ............ | 455/456.1 |

(Continued)

FOREIGN PATENT DOCUMENTS

EP 717574 A2 * 6/1996
JP 2002112344 A * 4/2002

OTHER PUBLICATIONS

Nextel® IDEN® Digital Multi-Service Phone, *I2000™ User's Guide*, NTN9110A, pp. 1-122.

(Continued)

*Primary Examiner* — Dwayne Bost
*Assistant Examiner* — Larry Sternbane

(57) ABSTRACT

A wireless communication device (102) includes a processor (406) and a wireless network interface (404, 407), communicatively coupled with the processor (406), for determining the presence of a network providing wireless communication service. The device (102) also includes a memory (408) for storing a plurality of emergency service connection profiles. One of the profiles is selected based on the network determined to be present. The selected profile is then presented via a user interface (302) to a user of the wireless communication device (102) as a single emergency call model that is uniform among the profiles.

20 Claims, 9 Drawing Sheets

U.S. PATENT DOCUMENTS

| | | | | |
|---|---|---|---|---|
| 2004/0022216 | A1* | 2/2004 | Shi | 370/335 |
| 2004/0192336 | A1* | 9/2004 | Walby | 455/456.1 |
| 2005/0003831 | A1 | 1/2005 | Anderson | |
| 2005/0143049 | A1 | 6/2005 | Hoke, Jr. | |
| 2005/0201528 | A1 | 9/2005 | Meer et al. | |
| 2006/0007038 | A1 | 1/2006 | Boling et al. | |
| 2006/0172720 | A1* | 8/2006 | Islam et al. | 455/404.1 |
| 2006/0193447 | A1 | 8/2006 | Schwartz | |
| 2006/0234727 | A1 | 10/2006 | Ashley, Jr. et al. | |
| 2006/0268902 | A1* | 11/2006 | Bonner | 370/401 |
| 2008/0227427 | A1 | 9/2008 | Kadavallur et al. | |

OTHER PUBLICATIONS

Patent Cooperation Treaty, Notification Concerning Transmittal of Copy of International Preliminary report on Patentability (Chapter 1 of the Patent Cooperation Treaty), Apr. 9, 2009, pp. 1-6, PCT/US2007/073561 No.

United States Patent and Trademark Office "Non-Final Office Action Summary", Feb. 8, 2010, pp. 1-29, U.S. Appl. No. 11/686,522.

United States Patent and Trademark Office "Final Office Action Summary", Oct. 18, 2010, pp. 1-27, U.S. Appl. No. 11/666,522.

United States Patent and Trademark Office "Non-Final Office Action Summary", Jun. 24, 2011, pp. 1-45, U.S. Appl. No. 11/686,522.

United States Patent and Trademark Office, "Final Rejection" for U.S. Appl. No. 11/686,522 dated Dec. 27, 2011, 29 pages.

Patent Cooperation Treaty, "PCT Seatch Report and Written Opinion of the International Searching Authority" for International Application No. PCT/US2007/65416 May 16, 2008, 8 pages.

* cited by examiner

UNIFORM EMERGENCY INTERCONNECT ACCESS IN A MULTI-MODAL DEVICE

BACKGROUND OF THE INVENTION

1. Field of the Invention

This invention relates in general to a wireless device and method for placing emergency calls from such a wireless device, and more particularly to a wireless device provided with an emergency service call model that is uniform regardless of the particular modem utilized to place an emergency call in a multi-modal device.

2. Description of the Related Art

Wireless communication devices with interconnect signaling capability are required by the FCC to provide emergency interconnect services, i.e., 911 calls. e911 is short for Enhanced 911, a location determining technology advanced by the FCC that enables mobile, or cellular, phones to place 911 emergency calls and enables emergency services to determine the geographic position of the calling device. When a person places a 911 call using a traditional phone with landlines, the call is routed to the nearest public safety answering point (PSAP) that then distributes the emergency call to the proper services. The PSAP receives the caller's phone number and the exact location of the phone from which the call was made.

Prior to 1996, in the United States, 911 callers using a mobile phone would have to access their own service providers and get verification of subscription service before the call was routed to a PSAP. In 1996 the FCC ruled that service providers must allow a 911 to go directly to the PSAP without regard to verification of service. Under this ruling, a 911 call must be handled by any available service carrier even if the caller is not a paying subscriber of that particular service carrier.

A host of service providers are available today, many with their own unique frequency range and communication protocols. Compatible hardware and/or software is needed to communicate with each provider. Direct broadcast satellite, GPS, WiFi, and mobile phones all use wireless modems to communicate, as do most other wireless services today. Wireless modems come in a variety of types, bandwidths, and speeds. Frequently, the modems used to allow these devices to communicate are standard devices over which the portable device developer has limited or no access to evoke changes.

To allow a single device the flexibility to communicate on a variety of networks, many devices are now provided with multiple modems. However, portable devices with multiple modems encounter significant e911 capability differences depending on the particular modems and protocols used. For instance, an iDEN modem is configured to automatically redial an emergency call number if the initial dial attempt fails. In contrast, a GSM modem does not have this feature and requires input from the user before it will retry the call. A caller that is used to an automatically redialing iDEN modem that is in an area where their e911 call is processed through a GSM network would not expect that they need to manually retry the call in the event the initial attempt fails. Other such differences between the modems in a multi-modal device confuse or annoy the user at a time when they can least afford it—at the time of an emergency.

Therefore a need exists to overcome the problems with the prior art as discussed above.

SUMMARY OF THE INVENTION

Briefly, in accordance with the present invention, disclosed is a wireless communication device capable of accessing emergency services, where the device has a plurality of emergency service connection profiles stored in memory. The device utilizes a wireless network interface to determine the presence of a network providing wireless communication services and then uses an emergency service selector for selecting, based on the network determined to be present, one of the profiles.

In accordance with an added feature, the present invention also includes a user interface for presenting a representation of any of the plurality of emergency service connection profiles via the user interface to a user of the wireless communication device as a single emergency call model that is uniform among the profiles.

In accordance with yet another feature, the wireless communication device further includes a plurality of modems, each corresponding to a different wireless network type, wherein each one of the profiles comprises a selection of an operation of one of the plurality of modems.

In accordance with still a further feature, each profile within the plurality of profiles corresponds to a different one of a plurality of network types.

In accordance with yet an added feature, the invention includes an interface adapted for accepting inputs, wherein the inputs are used to define one or more of the profiles.

In accordance with another feature, the invention includes a control signal output that controls peripheral devices based on instructions within the profile selected.

In accordance with yet another added feature of the invention, the defined profiles are defined for a text-based emergency service and/or a packet-based emergency service.

Other features of the invention provide an input for receiving a destination calling number and a comparator for comparing a received destination calling number with at least one number stored in the memory for determining if the received destination calling number matches a number stored in the memory and defined as an emergency contact number.

In accordance with still one more feature of the invention, one of the plurality of profiles defines an incoming call handling procedure, a redial procedure, a destination number call upgrade procedure, and/or a location determining procedure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
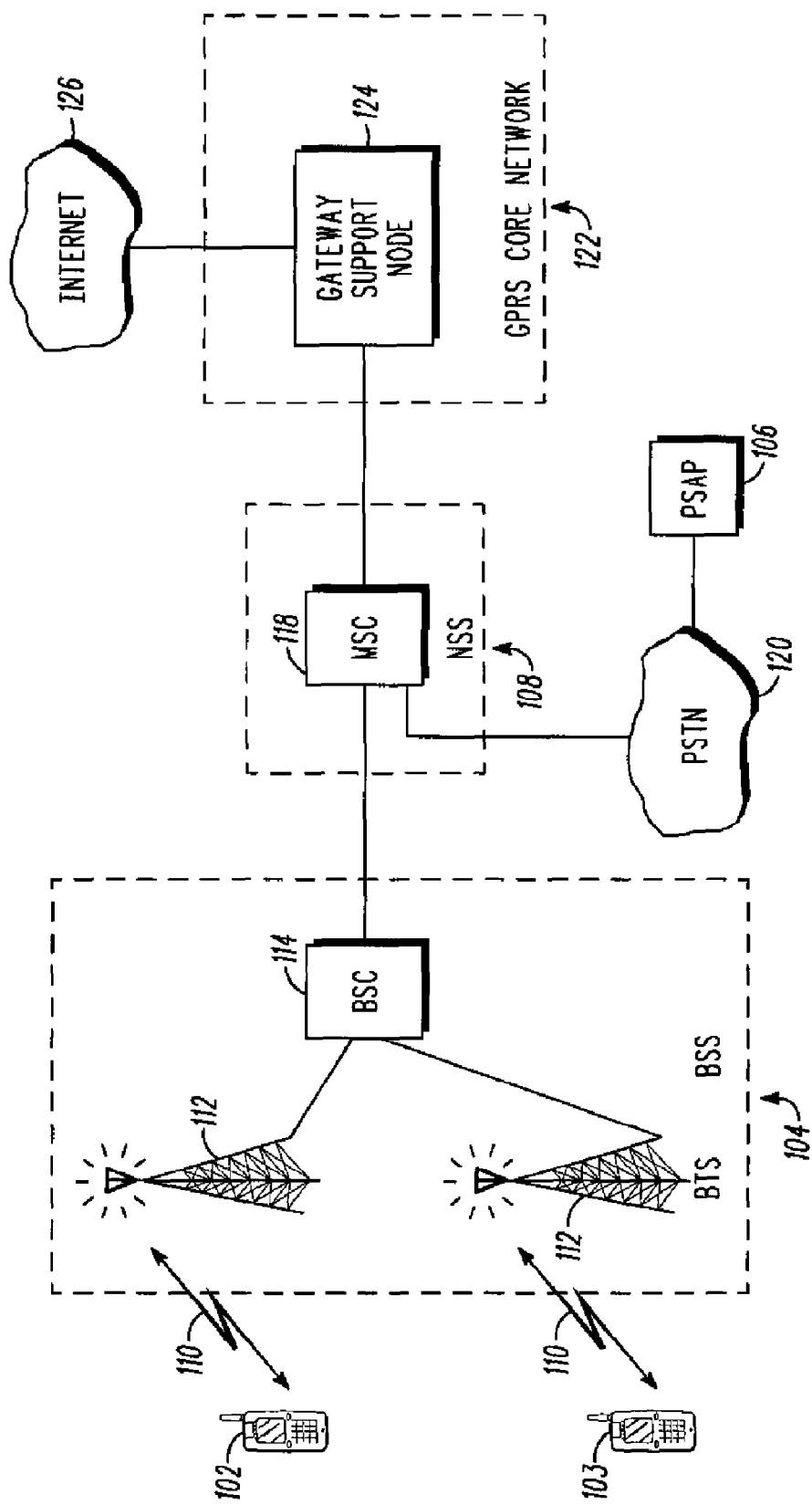
FIG. 1 is an illustration of a wireless communication network in accordance with an embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The present invention relates to a method and apparatus for presenting a uniform emergency call model to users of a multi-modal wireless device. Embodiments of the invention are able to simulate modem features that are not available on a particular modem being used to place the emergency call. The present invention can be utilized for situations in which the originating wireless device is within coverage of one or more wireless networks, including networks to which the wireless device does not subscribe to.

Carrier Services

Carrier networks operate on cellular networks or Wide Area Networks (WAN) and are controlled by cellular carriers including, but not limited to, Cingular Wireless, Sprint PCS, Metro PCS, Verizon Wireless, and T-Mobile Wireless. Cellular carriers are independent business entities that generally require a subscription to one or more services offered by that carrier in order for a user to obtain service. The services available on each carrier network include voice communication, text messaging, voice mail, caller identification, internet access, data access, and others. The services also vary in quantity, such as number of minutes or amount of data uploaded and/or downloaded.

Generally, each carrier varies from each other carrier in terms of the technology used to build and operate the networks. The variances include frequency band, protocols, interfaces, and others. Carrier networks typically employ an analog-based air interface and/or one or more digital-based air interfaces. Digital-based air interfaces utilize digital communication technologies including, but not limited to, Code Division Multiple Access (CDMA), Time Division Multiple Access (TDMA), Wideband Code Division Multiple Access (WCDMA), Code Division Multiple Access-3rd Generation (CDMA2000), frequency hopping, and the like. The communication units or devices that operate within these networks have wireless communication capabilities, such as IEEE 802.11, Bluetooth, or Hyper-Lan, and the like.

The Global System for Mobile Communications (GSM) is the most popular standard for mobile phones. GSM service is currently used by over 2 billion people across more than 210 countries and territories. The ubiquity of the GSM standard makes international roaming very common between mobile phone operators, enabling subscribers to use their phones in many parts of the world. The standard also provides network operators with the ability to deploy equipment from different vendors due to the fact that the open standard allows easy inter-operability.

Integrated Digital Enhanced Network (iDEN) is an also a widely-used mobile communications technology, developed by Motorola, Inc., which provides its users the benefits of a trunked radio and a cellular telephone. Through use of a single proprietary handset, iDEN supports voice in the form of both dispatch radio and PSTN interconnection, numeric paging, Short Message Service (SMS) for text, data, and fax transmission. iDEN uses a combination of Vector Sum Excited Linear Prediction (VSLP) and 16QAM (Quadrature Amplitude Modulation) for compression, and TDMA. It places more users in a given spectral space, compared to analog cellular systems, by using time division multiple access (TDMA). Using iDEN technology, up to six communication channels are placed within only a 25 kHz space.

Newer iDEN phones use a SIM card that is compatible with GSM phones for roaming. However, iDEN is a very different standard from GSM.

System Diagram

The following drawings will be helpful in understanding the present invention. Turning now to FIG. 1, a diagram of one embodiment of a network 100, in accordance with the present invention is shown. A wireless device, or "subscriber unit" 102 is illustrated. The subscriber unit 102 communicates with a Base Station Subsystem (BSS) 104 to link to other subscriber units 103 as well as a Public Safety Answering Point (PSAP) 106. The BSS 104 is the section of a network that is responsible for handling traffic and communication between a mobile phone 102 and a Network Switching Subsystem (NSS) 108. The BSS 104 performs allocation of radio channels to mobile phones, transcoding of speech channels, paging, quality management of transmission and reception over the wireless link 110, and many other tasks related to the radio network.

A Base Transceiver Station (BTS) 112 establishes service areas in the vicinity of the base station to support wireless mobile communication, as is known in the art. Each BTS 112 contains transceiver equipment, including a transmitter and a receiver coupled to an antenna, for transmitting and receiving radio signals. The BTS 112 also includes equipment for encrypting and decrypting communication with a Base Station Controller (BSC) 114. Typically a BTS 112 will have multiple transceivers (TRXs) that allow it to serve a plurality of frequencies and sectors of a cell.

The functions of a BTS 112 vary from carrier to carrier. There are carriers in which the BTS 112 is a plain transceiver which receives information from the subscriber units through the wireless link 110 and then converts it to an interface and sends it towards the BSC 114. There are carriers that have BTSs 112 that preprocess the information, generate target cell lists and even handle intracell handover.

The BTS 112 is controlled by a BSC 114. The BSC 114 is the brains behind the BTSs 112 and handles allocation of radio channels, receives measurements from the mobile phones, and controls handovers from BTS to BTS. A BSC 114 often controls 10 s or even 100 s of BTSs 112. Additionally, databases for the sites, including information such as carrier frequencies, frequency hopping lists, power reduction levels, receiving levels for cell border calculation, are stored in the BSC 114.

Networks are often structured to have multiple BSCs 114 distributed into regions near their respective BTSs 112, which are then connected to a large centralized Mobile Switching Center (MSC) 118 within the NSS 108. MSCs 118 are sophisticated telephone exchanges that provides circuit-switched calling, mobility management, and GSM services to the mobile phones roaming within the area that it serves. These services include data and fax, as well as SMS, call divert and others.

The NSS 108 is the component of a wireless network system that carries out switching functions and manages the communications between mobile phones 102 and the Public Switched Telephone Network (PSTN) 120. The PSTN 120 is the concentration of the world's public circuit-switched telephone networks and is in many ways similar to the Internet, which is the concentration of the world's public IP-based packet-switched networks. The PSTN 120 is largely governed by technical standards and uses E.163/E.164 addresses (known more commonly as "telephone numbers") for addressing.

The MSC 118 is coupled to a General Packet Radio Services (GPRS) Core Network 122, which provides mobility management, session management and transport for Internet Protocol packet services. The GPRS 122 includes a GPRS Gateway Support Node 124, which is an interface between the GPRS wireless data network 122 and other networks such as the Internet 126 or private networks.

Cells

GSM and iDEN networks are "cellular," which means that mobile phones connect to it by searching for cells in the immediate vicinity. Generally, cells are categorized into four different cell sizes—macro, micro, pico, and umbrella cells. The coverage area of each cell varies according to the environment in which it is implemented. Macro cells can be regarded as cells where the base station antenna is installed on a mast or larger building structures that are taller than an average roof-top level. Micro cells are cells whose antenna height below average roof top level and are typically used in urban areas. Picocells are small cells whose diameter is only few dozen meters; they are used mainly in indoor applications. Lastly, umbrella cells are used to cover shadowed regions of smaller cells and fill in gaps in coverage between those cells.

A cell's radius varies greatly depending on a variety of factors, such as antenna height, antenna type, frequency, antenna gain, landscape, weather, and other propagation conditions. Typically, cells are no larger than 20 miles.

Figure 2:
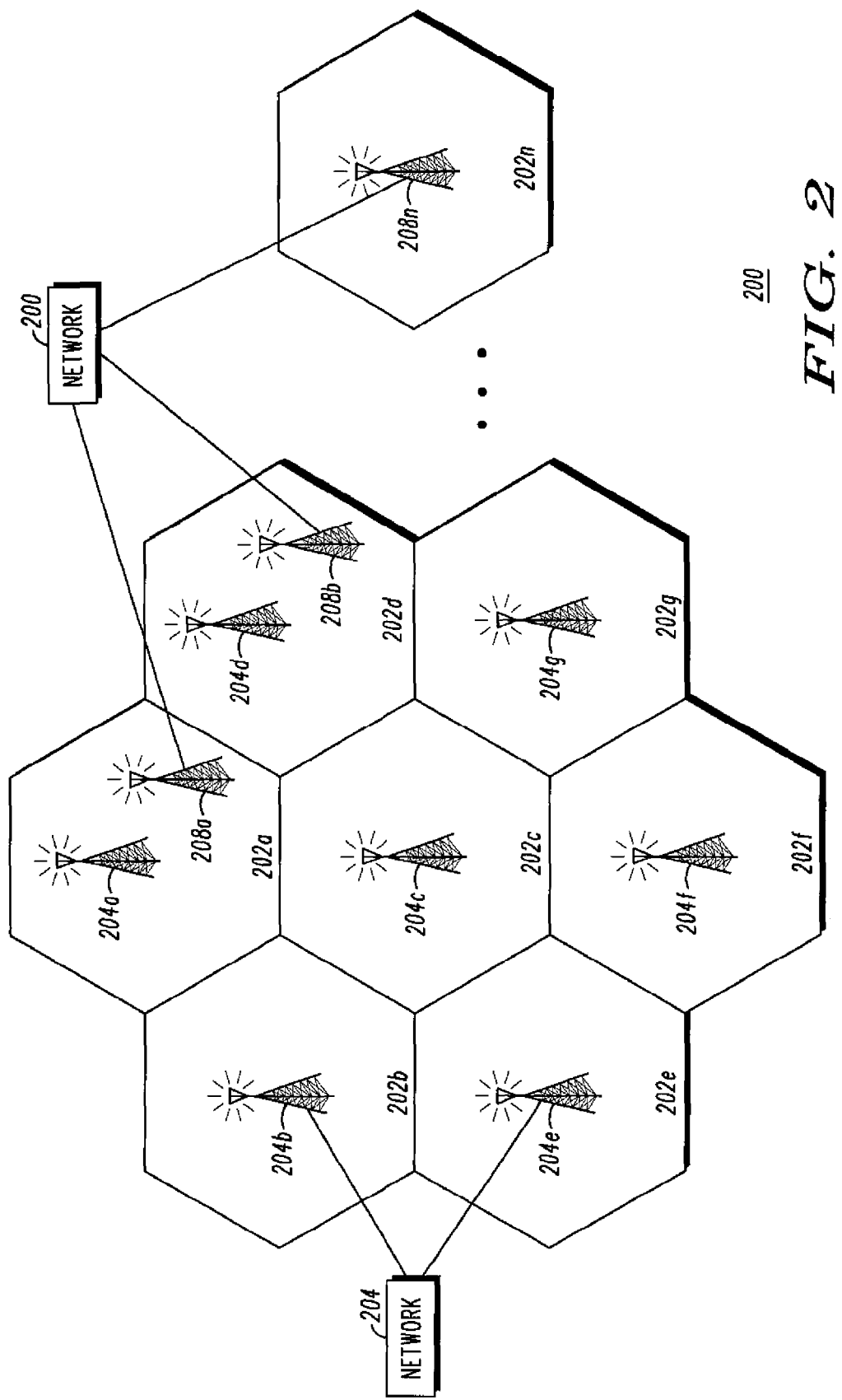
FIG. 2 is an illustration of multiple communication networks providing service to multiple cells in a geographic area in accordance with an embodiment of the present invention.

FIG. 2 illustrates a cellular pattern 200, consisting of a group of cells 202a-n. The cells 202a-n are within coverage of a communication network 204. The communication network 204 has deployed a set of BTSs 204a-n, each serving one of the cells 202a-n within the cellular pattern 200. Therefore, wireless devices that subscribe to a carrier operating network 204 are able to connect to any of BTSs 204a-n and receive wireless services provided by that carrier. However, at least one of the cells, 202n, does not have a BTS. A device subscribing to services from the network 204 will not receive service from network 204 once it enters cell 202n because it is out of range of any BTSs deployed by that network.

Multiple Network Communication

As stated above, many subscriber units (wireless devices) 102 have the ability to operate over any of a plurality of networks using a plurality of air interface technologies each defined by the carrier operating that network. The mechanisms that enable this ability of the subscriber units are explained in detail in the following section.

Referring again to FIG. 2, a second network 206 is shown operating within a portion of the coverage area of the first network 204. The second network 206 can be any network utilizing any available technology to provide service to a set of subscribers. For instance, the first network 204 may be the Sprint network, while the second network 206 is the Cingular Wireless network. The present invention is not limited to any specific network(s).

The second network 206 has deployed a set of BTSs 208a-n that provide wireless coverage to at least a portion of cells 202a, 202d, and 202n. Therefore, a wireless device 102 within either cell 202a or 202d is able to receive signals from the first network 204 and the second network 206. On the other hand, a wireless device within cell 202b receives service from the first network 204 only and a device 102 within cell 202n will receive service from the second network 206 only.

In typical real-world applications, each cell 202a-n is serviced by three or more carriers, so at any given time a device is within coverage of multiple competing networks.

911

In addition to other efforts to promote coordinated emergency services, the FCC has adopted wireless 911 emergency calling rules. These rules are aimed at improving the reliability of wireless 911 services and identifying the location of wireless 911 callers to enable emergency response personnel to provide assistance to them much more quickly. The FCC's wireless 911 rules apply to all wireless licensees, broadband Personal Communications Service (PCS) licensees, and certain Specialized Mobile Radio (SMR) licensees. The FCC's Basic 911 rule requires wireless carriers to transmit all 911 calls to a Public Safety Answering Point (PSAP) 106, regardless of whether the caller subscribes to the carrier's service or not.

Therefore, each carrier must accept a request for connection to a PSAP 106 from any requesting device, regardless of whether a user of the device is a subscriber to that service or not. In order for wireless devices 102 to be able to communicate with multiple carriers, each employing differing technologies, the devices 102 themselves must be equipped with the ability to transmit and receive on those networks using the language spoken by the respective networks.

Subscriber Unit

Figure 3:
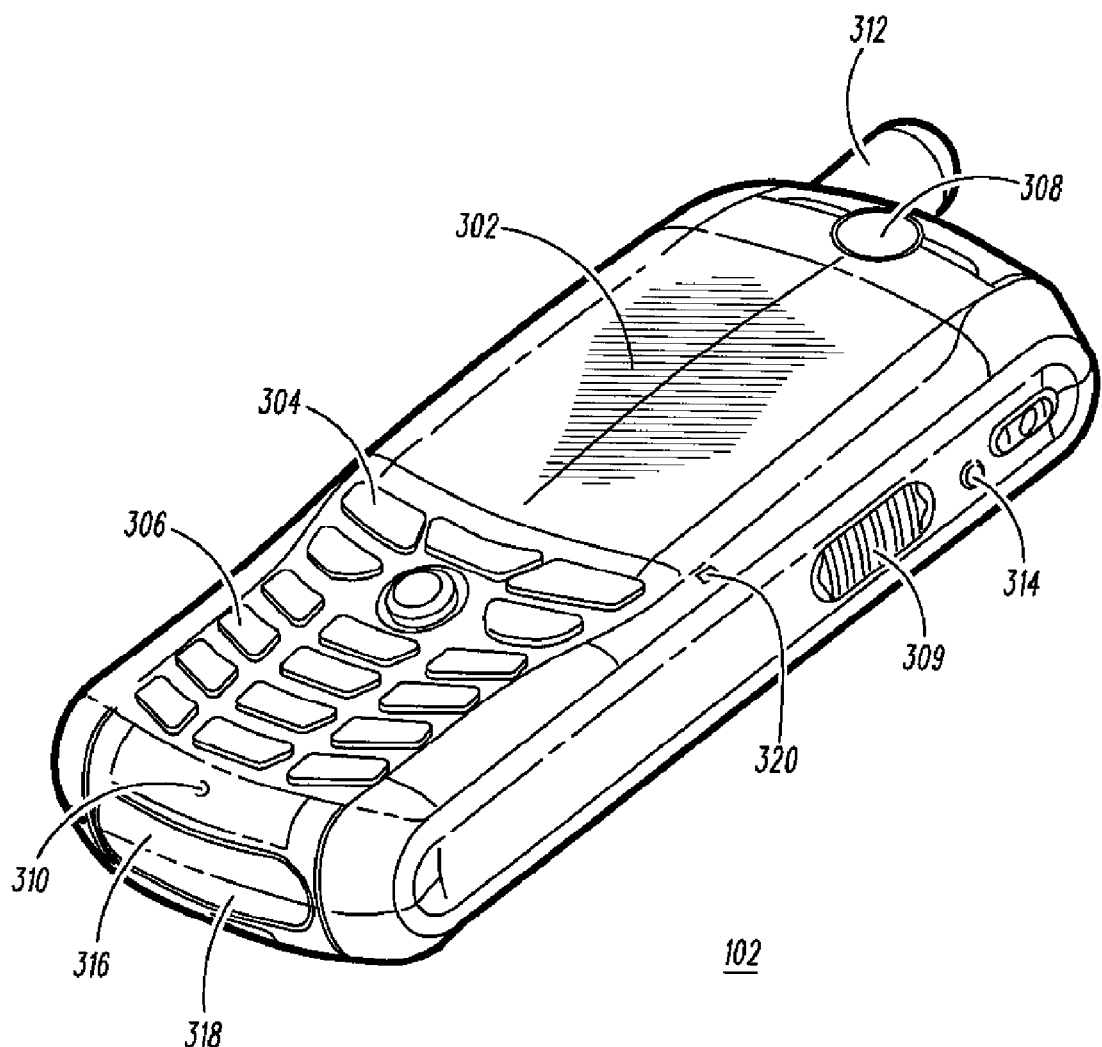
FIG. 3 is an illustration of a user interface of a wireless communication device in accordance with an embodiment of the present invention.

Referring now to FIG. 3, an example of a wireless device 102 is shown. The specific wireless device 102 depicted in FIG. 3 is a cellular telephone. As will be clear however, the present invention is not so limited and can also be used with other wireless devices, including, but are not limited to, PDA's, SmartPhones, Laptops, Pagers, Two-way Radios, satellite phones, and other communication devices. In one embodiment of the present invention, the wireless device 102 is capable of receiving and transmitting radio frequency signals over a communication channel under a communications protocol such as CDMA, FDMA, TDMA, GPRS, and GSM or the like. For the purposes of illustration and ease of discussion, a wireless telephone, its structures, and functions will be referred to throughout the specification.

The cellular telephone 102 includes a display 302 for viewing information and commands, command buttons 304 for controlling modes and commands of the device, buttons 306 for entering information and dialing numbers, an earpiece speaker 308 for generating voice and messaging information, audible alerts, and any other audio in a private manner, one or more high audio speakers 309 for generating voice and messaging information, audible alerts, and any other audio at arms length, a microphone 310 for capturing and converting audible sounds to proportionate voltages, a light source 320 for visual indications, an antenna 312 for wirelessly communicating with a remote sender or receiver, a jack 314 for connecting external audio playback devices, such as a headphone or speaker, a battery charger jack 316, and input/output (IO) ports 318 for accessing the phone's internal circuitry for purposes such as inputting and outputting data.

The wireless device 102 interfaces with provider equipment via a wireless communication link 110 established with base stations 112. The wireless device 102, according to the present example, works in conjunction with the provider equipment to provide a user with services such as telephone interconnect, short message service, dispatch or instant conferencing, circuit data, packet data, and combinations thereof, as well as emergency services.

Subscriber Device Internal Circuits

Figure 4:
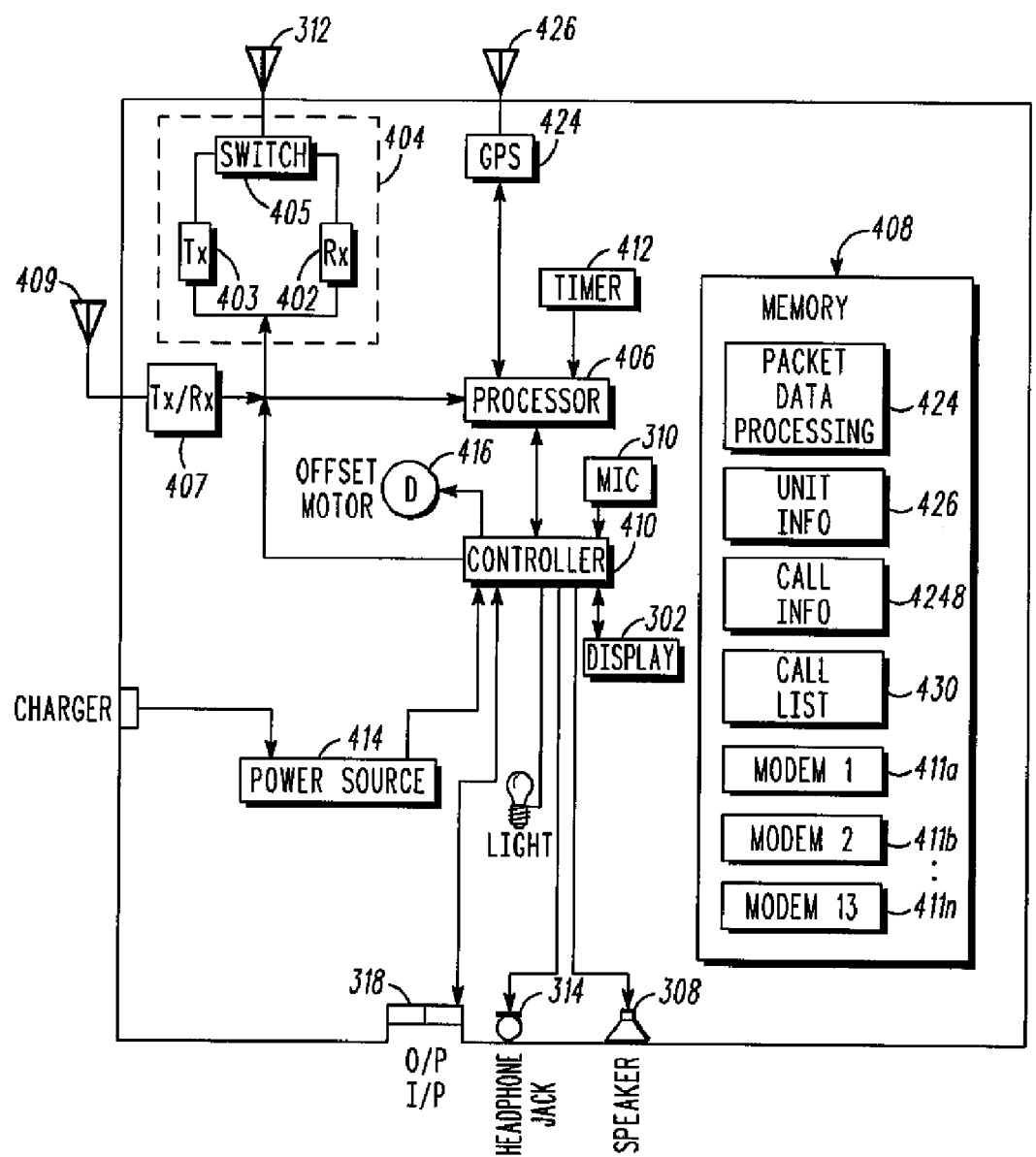
FIG. 4 is a simplified block diagram of a wireless communication device in accordance with an embodiment of the present invention.

Referring now to FIG. 4, a simplified schematic of a wireless communication unit 102, shown in FIG. 3, that is capable of facilitating communication with multiple wireless communication networks, is shown. The communication unit 102 is generally known, thus the known functions and structure of such devices will not be described in detail other than as related to the inventive principles and concepts disclosed and discussed below.

The communication unit 102 includes an antenna 312 or antenna structure that operates as both an input and an output to couple radio frequency signals between a transceiver 404 and at least a first and second network 204, 206. The transceiver 404 acts as a wireless network interface to allow the communication unit 102 to detect the presence of one or more available networks and communicate with one of the detected networks. The transceiver 404 includes a transmitter 403 and a receiver 402. The transmitter 403 and receiver 402 are coupled via an antenna switch 405 to the antenna 312. For transmit operations, the antenna switch 405 couples the transmitter 403 to the antenna 312. Similarly, for receive operations, the antenna switch 405 couples the antenna 312 to the receiver 402. For example, radio signals that are transmitted from BTSs 204a and 208a are absorbed by the antenna 312 and coupled to the receiver 402 by the switch 405.

The transceiver 404 is inter coupled and interactively operates with a processor 406. The processor 406 is a known processor-based element with functionality that will depend on the specifics of the air interfaces with the networks in communication, as well as various network protocols for voice and data traffic. The processor 406 is able to execute program instructions stored in a memory 408 and to store data received from the transceiver 404 in memory 408 and is able to operate to encode and decode voice and data messages to provide signals suitable for the transceiver 404, a transducer, or further processing by the controller 410.

A memory 408 is present and can be a combination of known RAM (Random Access Memory), ROM (Read-Only Memory), EEPROM (Electrically Erasable Programmable ROM), FLASH, or magnetic memory. The memory 408 is used to store various items or programs, an operating system, or software and data, such as caller lists, for execution or use by the processor 406. This operating software when executed by the processor 406 will result in the processor performing the requisite functions of the communication unit 102 such as interfacing with a user interface, which includes any of the elements shown in FIG. 3, and transceiver(s) 404. The memory 408 further includes call processing routines not specifically shown for supporting voice and data calls that will be appreciated by one of ordinary skill and that will vary depending on an air interface, call processing, and service provider or network specifics.

Additionally, the memory 408 includes packet data processes 424 that are provided for formulating appropriate packets for transport according to the specifics of the communication networks. Furthermore various data is provided in the memory, specifically unit information 426, including identification information to identify the communication unit 102, and call information 428. Collectively this information can be used to identify a particular unit and a particular call.

A further memory location 430 is used to store device, system, or user specified information. One example of such information is a call list used to facilitate communication to a PSAP 106 or other devices 103 within the network or within other networks to which the originating device 102 is not a member. This information can also be stored in other locations in memory 408 or other memories that are a part of the wireless device 102 or are external to the wireless device 102.

The controller 410 selects between incoming-call notification modes in response to instructions provided from the processor 406. The processor 406 and controller 410 can be separate, discrete components or can be a single integrated unit. The processor 406 may include one or more generally available microprocessors, digital signal processors, and other integrated circuits depending on the responsibilities of the controller 410 with respect to signal processing duties or other unit features.

Accordingly, the transceiver 404, as controlled by, and in cooperation with, the controller 410 and functions thereof, provide the communication unit 102 with multi or dual operating mode capability. More particularly, the communication unit 102 is capable of registering with and obtaining service from the first 204 and second 206 communication networks. The controller 410 can operate to determine whether the wireless device is within coverage or outside the coverage of a particular wireless network in many different ways, as should be obvious to those of ordinary skill in the art in view of the present discussion. For example, and without limitation, some transceivers use a received signal strength indication (RSSI) signal to indicate whether the wireless device is in coverage of a wireless network. As another example, and without limitation, a signal coding scheme such as used for CDMA type wireless communication systems can be received and decoded by a transceiver to indicate whether the wireless device is in coverage. As a third example, and without limitation, a wireless device may utilize a location detection means to detect the location of the wireless device in a geographic area. A location detection means may include use of a GPS receiver or other signal receiver that indicates location of the device within a geographic area. The location of the wireless device in a geographic area may be used to determine whether the wireless device is within coverage or outside of the coverage of a wireless network. Other equivalent forms of determination of in-network or outside-of-network coverage for the wireless device should be obvious to those of ordinary skill in the art in view of the present discussion.

Embodiments of the present invention utilize multiple modems for communicating with multiple networks. A subscriber unit's modem(s) 411a-n is the interface between that subscriber unit and the network. The modem converts signals produced by the subscriber unit to a form compatible with a network(s) to which it is designed to communicate, and vice versa. In accordance with one of several of these embodiments, the modems 411a-n are software routines comprised of instructions stored in memory 208, hardware, or a combination of the two, but however realized, enables the subscriber unit to communicate with a carrier network.

Frequently, the modems used are standard devices over which the portable device developer has limited or no access to evoke changes. Portable devices with multiple modems encounter significant e911 capability differences depending on the modems and protocols used. These differences result in an inconsistent user experience, which in turn, can result in confusion at a time when a user can tolerate it the least—during an emergency.

For instance, an iDEN modem is capable of automatically redialing the call if the initial dial attempt fails. A GSM modem does not automatically redial. Therefore, a user that is used to an iDEN modem might assume that her call is being retried until connection with emergency services is reached, but instead the GSM modem is sitting idle and waiting for additional input from her. Additionally, an iDEN modem is designed to block all other calling services, such as incoming messages and call waiting features that interrupt the current call to inform a user that another call is incoming. This blocking feature allows the user to concentrate solely on obtaining emergency assistance. GSM modems do not have this feature. A user that is used to the call blocking feature may become confused when using a GSM modem and is suddenly notified of an incoming call.

Another example of a modem difference is call upgrading. iDEN phones recognize certain numbers other than the three digits 911 as an emergency number and begin 911 modem features, such as the above described call service blocking and automatic redial attempts. Some GSM phones, on the other hand, only recognize the numbers 112 and 911 as emergency calling strings.

Some embodiments of the present invention can provide that the transceiver 404 is configurable to support simultaneous air interfaces with multiple communication networks according to the conventions and protocols of each. Other embodiments of the present invention provide additional transceivers 407 and/or antennas 409, each suited for a particular type of network. In these embodiments, the modems 411a-n work with or are contained within additional transceivers 407 that work in conjunction with additional antennas 409. Multiple transceivers 407 and antennas 409 are used to communicate with networks operating on widely varying frequency bands. In other embodiments, the same transceiver operates on multiple antennas. In the present invention, a modem can be a set of software instructions, a piece of hardware, or a combination of software and hardware. The particular systems, which vary in terms of frequency and modulation techniques, among other things, dictate the specifics of a modem.

For instance, iDEN operates in the 800 MHz, 900 MHz, and 1.5 GHz bands and is based on time division multiple access (TDMA) and GSM architecture. It uses Motorola's Vector Sum Excited Linear Predictors (VSELP) vocoder for voice compression and QAM modulation to deliver 64 Kbps over a 25 KHz channel. In the 900 MHz band the uplink frequency band is 890-915 MHz, and the downlink frequency band is 935-960 MHz. This 25 MHz bandwidth is subdivided into 124 carrier frequency channels, each spaced 200 kHz apart. Time division multiplexing is used to allow eight speech channels per radio frequency channel. There are eight radio timeslots (giving eight burst periods) grouped into what is called a TDMA frame. The channel data rate is 270.833 kbit/s, and the frame duration is 4.615 ms.

GSM networks, on the other hand, operate in the 850 MHz and 1900 MHz bands. The modulation used in GSM is Gaussian minimum shift keying (GMSK), a kind of continuous-phase frequency shift keying. In GMSK, the signal to be modulated onto the carrier is first smoothed with a Gaussian low-pass filter prior to being fed to a frequency modulator, which greatly reduces the interference to neighboring channels (adjacent channel interference).

These different techniques require hardware and software that can support them. In any event, a modem 411a-n, in accordance with the present invention, provides a communication link between the subscriber device 102 and one or more networks 204, 206 regardless of the specifics of implementation. In addition, the modems 411a-n are not limited only to those that are compatible to the networks described herein.

A timer module 412 provides timing information to the processor 406. The processor 406 utilizes the time information from the timer module 412 to keep track of scheduling or executing tasks. The wireless device 102 also includes a power source 414, such as a DC battery.

The controller 410 also couples the processor 406 to a global positioning system (GPS) receiver 424. The GPS receiver 424 receives signals from satellites via GPS antenna 426 in a well-known manner to enable the device 102 to determine its geographic location on the earth. Many GPS units are accurate to within four feet or less.

The controller 410 is coupled to and generally operates in a known manner with a user interface, such as that shown in FIG. 3. Elements of a user interface are known and typically include, for example, audio transducers, such as an earphone or speaker 308, 309 and microphone 310, a display 302, and a keypad 306, 308. The transceiver and user interface are each intercoupled and the controller 410 provides overall operational command and control for the communication unit 102. The elements of the user interface include one or more means for providing output to a user, such as the graphics display screen 302, the speaker, display lights 320, tactile feedback devices 416, and others as should be obvious to those of skill in the art in view of the present discussion. The user interface also includes one or more means for providing input to the device, such as the keypad buttons 306, 304, the microphone 310, a display 302 that is functional as a touch screen, a data port 318, and others as should be obvious to those of skill in the art in view of the present discussion.

In addition, the device 102 has a timer 412 for synchronization, determining elapsed time, and for time of day. The timer 412 can be used in conjunction with memory 408 to provide a calendar for the device for tracking and differentiating days, months, and years.

Subscriber Unit Operation

As described above, due at least in part to FCC rules, discovery of e911 service is present in all cellular handsets. The discovery is not just of the subscriber's own network, but of any available network through which an emergency call can be placed. For example, the iDEN i2000 handset includes a system search algorithm which allows it to search for available e911 service on either the iDEN protocol or GSM protocol.

Some embodiments of the present invention can utilize the subscriber device's current system search algorithm to a) quickly find an available system capable of providing a connection to emergency services, b) discover the capabilities of the network and the modem being used to access that network, and, in accordance with the present invention, c) present the e911 calling capabilities to the user in a consistent emergency call model that is uniform regardless of the system providing service. In other words, the subscriber device utilizes the device's resources to mimic a selected call model regardless of the network he is connected to and modem being used. The selected call model can be the normal behavior of the modem when connected to the subscriber's home network, or can be a custom configuration selected by the user.

Figure 5:
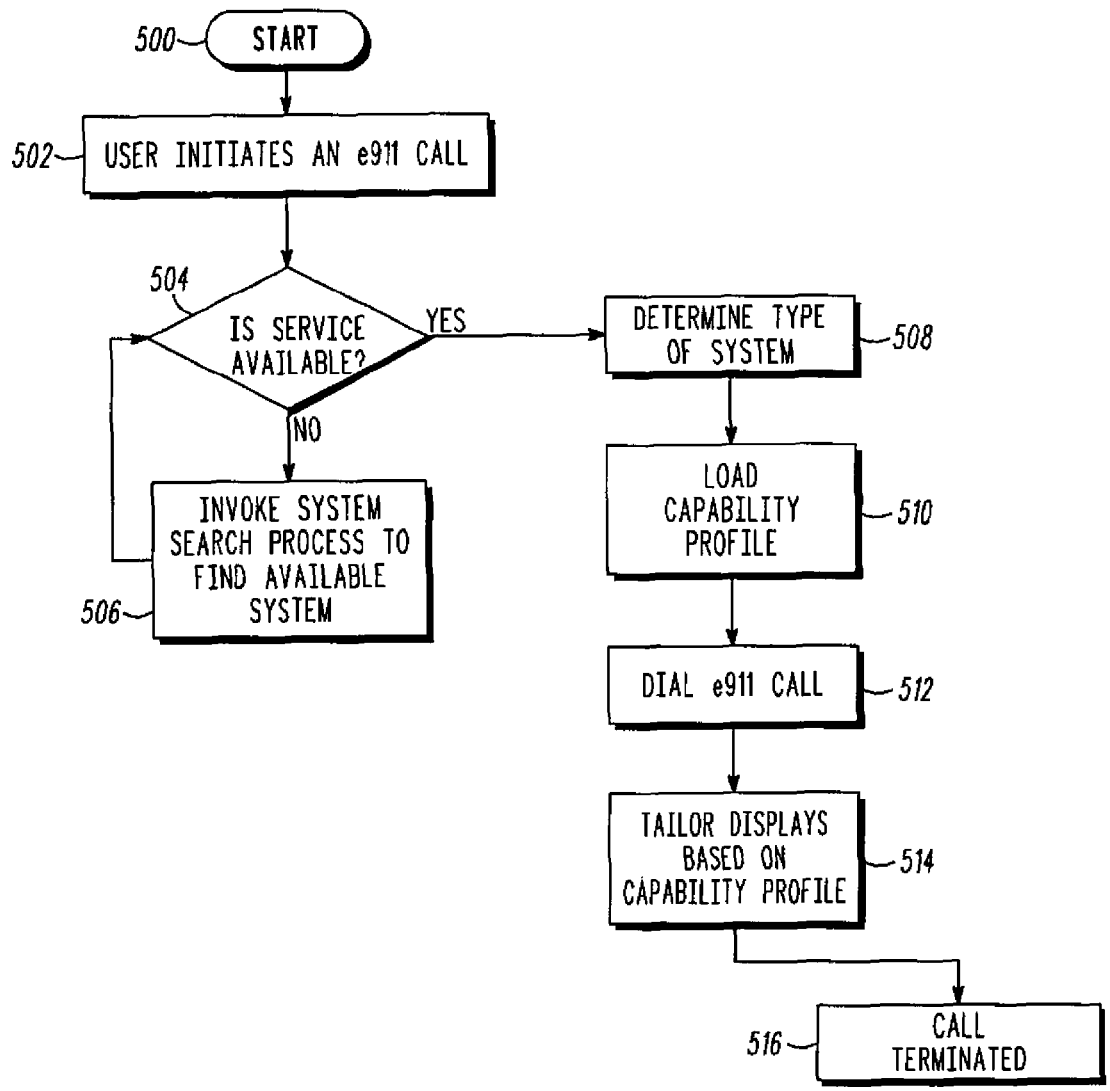
FIG. 5 is a flow diagram illustrating the process of presenting a uniform emergency call model to a user of a wireless device in accordance with an embodiment of the present invention.

FIG. 5 shows a process flow of an embodiment of the present invention. The flow starts at step 500 and moves directly to step 502, where a user initiates an e911 call. Upon user initiation of the e911 dialing sequence, the handset checks to see, in step 504, if it has system connectivity. If it does not, the process moves to step 506, where it invokes its system search routine to find a suitable system for e911 service. The flow alternates back and forth between steps 504 and 506 until a service becomes available. Once service becomes available, the type of system is determined in step 508. A capability profile for the type of system and/or type of modem is loaded in step 510. The emergency service selector for performing this function is the processor 406 by itself or in conjunction with any other component of the wireless device, such as memory 408 and controller 410. In the next step, 512, an e911 call is immediately placed. When the call is connected, the capability profile is used in step 514 to tailor the user interface and/or automatically invoke additional services. Finally, in step 516, the call is terminated and the process ends.

The additional services invoked in step 514 of FIG. 5 are any feature of any modem selected by a user of the wireless device placing the e911 call or can be features that are not part of any standard modem, but are specified by the user of the e911 calling device.

Following the flowchart of FIG. 5, the handset in one embodiment of the present invention determines if the protocol used is GSM or iDEN. In the case of an iDEN call, if a call failure is detected, the user interface merely tells the user the e911 call is proceeding, and allows the modem to make subsequent redial attempts. Once connected to a call, routines to block extraneous incoming services are disabled, as the modem is capable of providing this functionality. Routines which allow notification of assist data and/or e911 call upgrades are activated, since the modem can provide this information to the user.

In the case of a GSM call, if a call failure is detected, the user interface invokes redialing routines, since the modem is incapable of automatically redialing a failed call. Routines which allow notification of assist data and/or e911 call upgrades are deactivated, since the capability is not present. Finally, routines to block extraneous incoming services are activated, to prevent user distraction during the emergency call period.

Figure 6A:
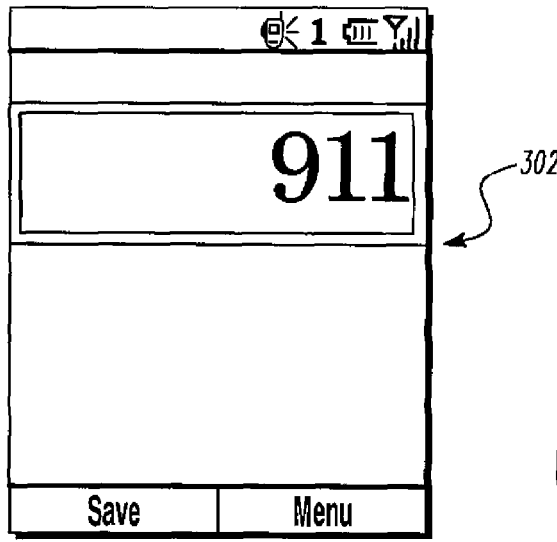
FIGS. 6a-6e are illustrations of a wireless device display screen during the steps of the flow illustrated in FIG. 5 in accordance with an embodiment of the present invention.
Figure 6B:
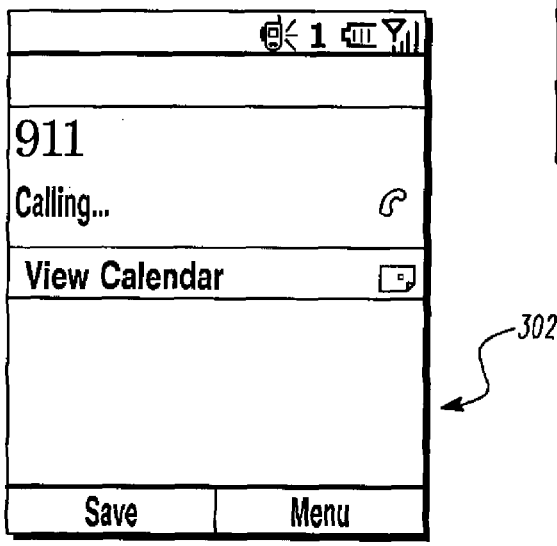
Figure 6C:
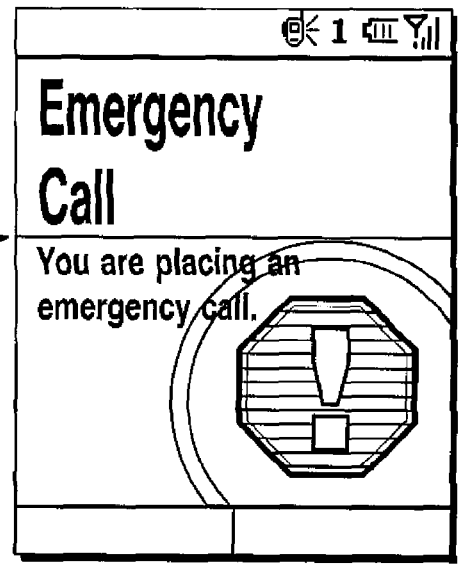
Figure 6D:
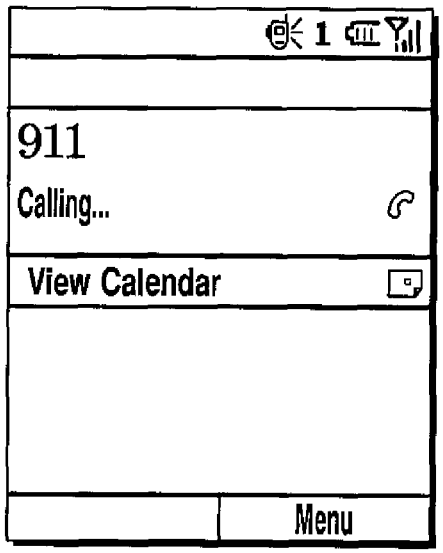
Figure 6E:
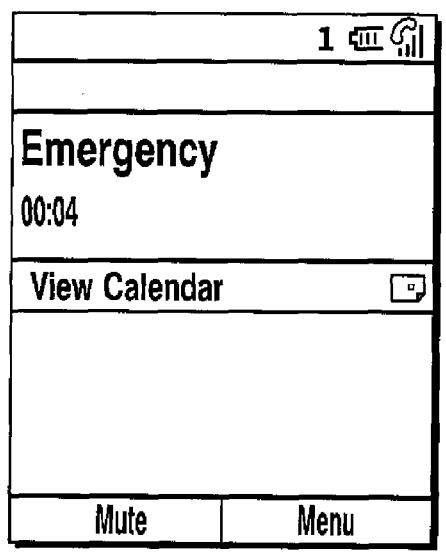

FIGS. 6a-6e and 7a-7e show examples of screen shots of an emergency call being placed in accordance with embodiments of the present invention. The specific graphics displayed on the display 302 illustrated in the screen shots shown in FIGS. 6a-e are an example of an implementation of emergency interconnect calling for the i930/i920 products on a Nextel network. The invention is not, however, limited to any specific network(s) or carrier(s). In FIG. 6a, the emergency number 911 is dialed and is displayed on the display 302. FIG. 6b shows the display 302 after the "enter" key is depressed, which caused the number to be called. The display 302 indicates to the user that the call is being connected. In FIG. 6c, the handset acknowledges that the number is an emergency number by displaying the emergency call screen. At this time, the device implements whatever capability profile has been specified. The capability profile in this embodiment is specified by the manufacturer. However, nothing prevents specification by the carrier, the network or by the user. For instance, all incoming calls will now be disregarded while in emergency mode. The phone then sends data indicating its location to emergency services. This screen is shown in FIG. 6d, but looks the same as the screen shown in FIG. 6b. Finally, as shown in FIG. 6e, the emergency number is connected and the user is able to obtain emergency services.

Figure 7A:
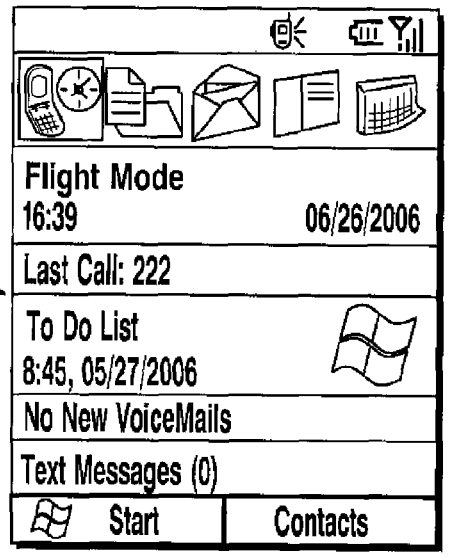
FIGS. 7a-7e are illustrations of a wireless device display screen during a process where the wireless device changes from an off-line mode to presenting a uniform emergency call model to a user in accordance with an embodiment of the present invention.
Figure 7B:
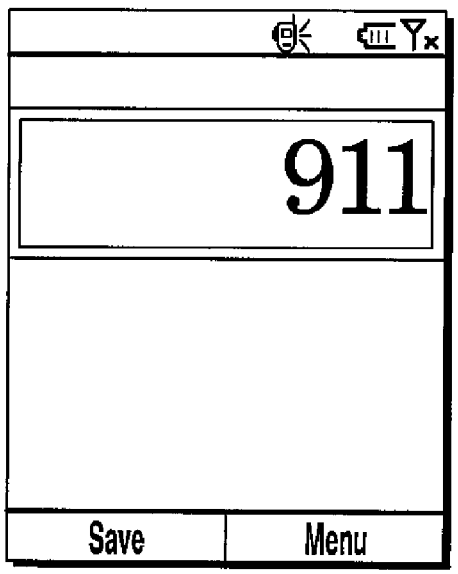
Figure 7D:
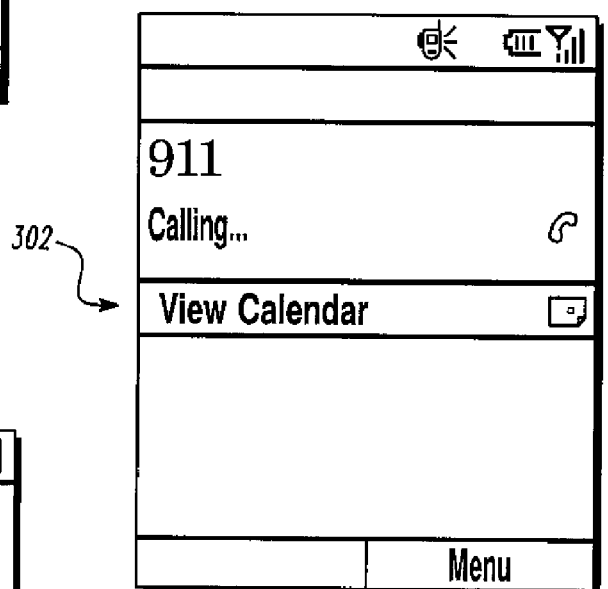
Figure 7C:
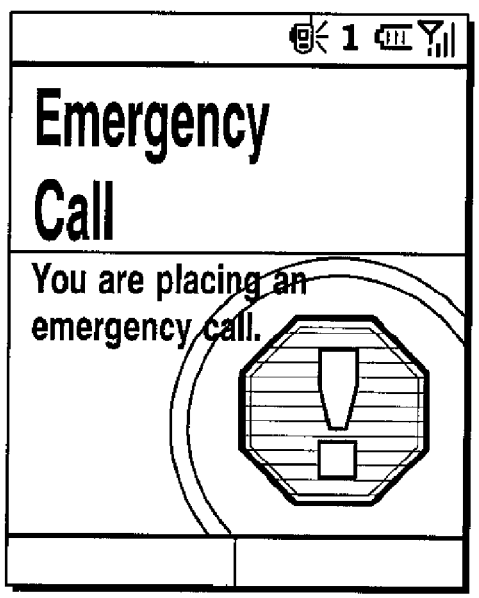
Figure 7E:
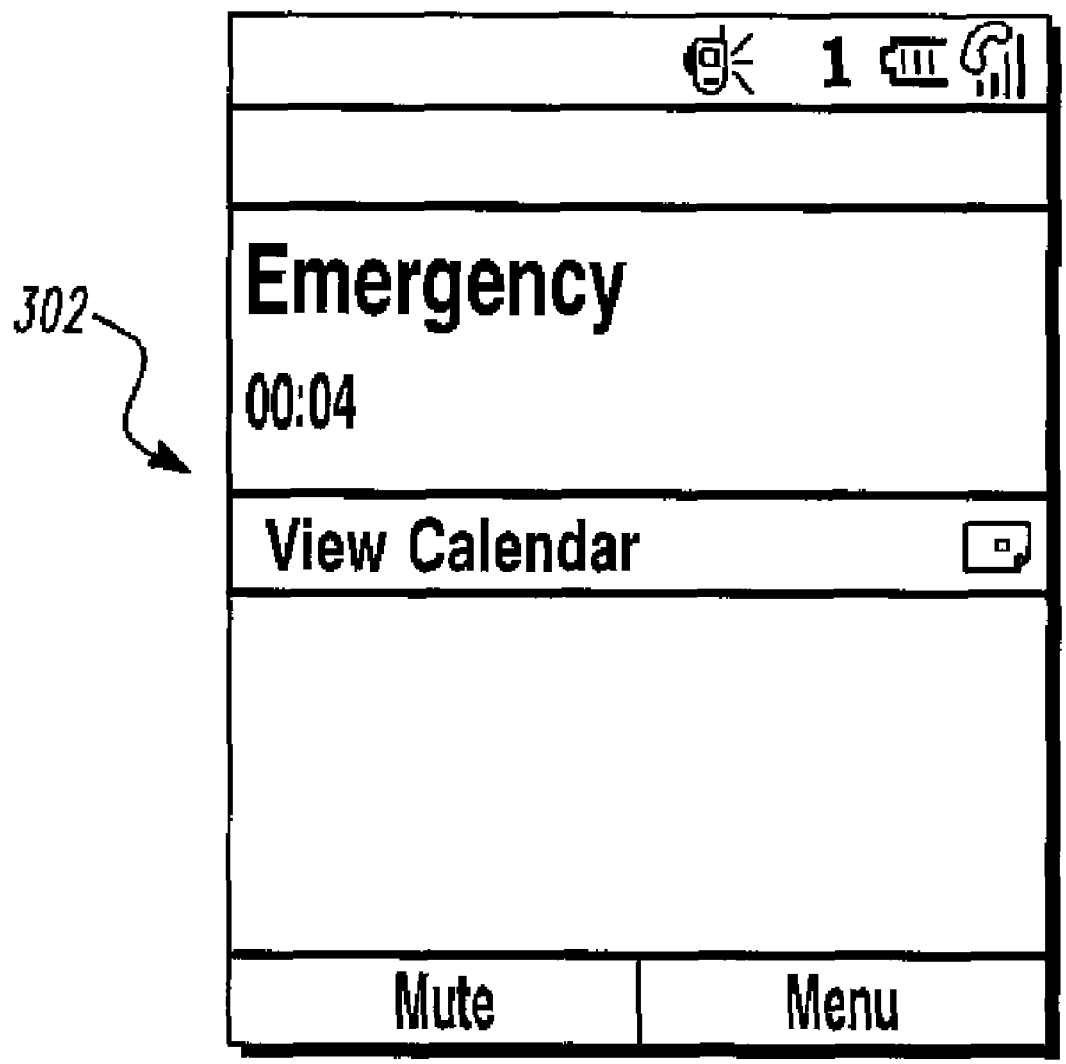

In one embodiment of the present invention, a monitoring routine provides data on the current RF state of the phone. For example, the user may currently be in an RF-disabled mode to utilize the handset as a PDA only. Other cases may include powering up the handset in a roaming scenario, where the handset is no longer in its home system coverage (e.g. powering on the phone when disembarking a plane in Europe). This scenario is shown in FIGS. 7a-7e. In FIG. 7a a screenshot of a wireless device shows the device in an off-network mode—flight mode in this example. A user in need of emergency services is able to dial an emergency number while in the off-network mode. Once the user presses the "send" button, the display 302 looks like that depicted in FIG. 7b. In FIG. 7c the handset acknowledges that the number is an emergency number. A call connecting screen, as shown in FIG. 7d, indicates to the user that the call is proceeding. The handset then searches and finds an available system. In this embodiment of the invention, the screen does not change for this operation. Once the system is found, the call information is sent to the system and then the device's location data is transferred to the system. Again, a change in the display does not occur during these steps. Finally, the device connects to emergency services and the screen shown in FIG. 7e is shown on the device.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A wireless communication device including means for accessing emergency services, the device comprising:
   a processor;
   a memory, communicatively coupled with the processor, for storing a plurality of emergency service connection profiles, wherein each emergency service connection profile indicates at least one wireless communication capability supported by a network associated therewith at least during an emergency service connection;
   a wireless network interface, communicatively coupled with the processor, for determining the presence of a network providing wireless communication service;

an emergency service selector, communicatively coupled with the processor, for selecting one of the emergency service connection profiles based on the network determined to be present; and a user interface, communicatively coupled to the processor, for presenting a representation of any of the plurality of emergency service connection profiles via the user interface to a user of the device as a single emergency call model that is uniform among the profiles, the user interface also comprising input means for receiving, from a user, a destination calling number; and a comparator, communicatively coupled with the user interface and the processor, for comparing a received destination calling number with at least one number stored in the memory for determining if the received destination calling number matches a number stored in the memory and defined as an emergency contact number associated with one of the plurality of emergency service connection profiles;

wherein the processor is configured with software to present a representation of the matching one of the plurality of emergency service connection profiles to the user via the user interface while contemporaneously the emergency service selector follows the selected one of the plurality of emergency service connection profiles to obtain an emergency service connection based on the network determined to be present; and wherein the matching one of the plurality of emergency service connection profiles is different from the selected one of the emergency service connection profiles.

2. The wireless communication device according to claim 1, further comprising:
a plurality of modems, each corresponding to a different wireless network type, wherein each one of the profiles comprises a selection of an operation of one of the plurality of modems.

3. The wireless communication device according to claim 1, wherein:
each profile within the plurality of profiles corresponds to a different one of a plurality of network types.

4. The wireless communication device according to claim 1, further comprising:
an interface adapted for accepting inputs, wherein the inputs are used to define one or more of the profiles.

5. The wireless communication device according to claim 4, wherein:
the defined profiles are defined for at least one of a text-based emergency service and a packet-based emergency service.

6. The wireless communication device according to claim 1, wherein one of the plurality of profiles defines at least one of:
an incoming call handling procedure;
a redial procedure;
a destination number call upgrade procedure; and
a location determining procedure.

7. A method in a wireless communication device for accessing emergency services, the method comprising:
receiving from a user, via a user interface, a destination calling number;
comparing the received destination calling number with at least one number stored in memory;
determining if the received destination calling number matches a number stored in the memory and defined as an emergency contact number associated with one of a plurality of emergency service connection profiles;
determining, a presence of a network providing wireless communication service;
selecting, based on the network determined to be present, one of the plurality of emergency service connection profiles, wherein each emergency service connection profile indicates at least one wireless communication capability supported by a network associated therewith at least during an emergency service connection;
sending a request for emergency service connection to the network determined to be present; and
presenting a representation of the matching one of the plurality of emergency service connection profiles to the user via the user interface while contemporaneously following the selected one of the plurality of emergency service connection profiles to obtain an emergency service connection based on the network determined to be present; and
wherein the matching one of the plurality of emergency service connection profiles is different from the selected one of the emergency service connection profiles.

8. The method according to claim 7, further comprising:
determining a type of the network service determined to be present; and
selecting the emergency service connection profile based on the type of network service determined to be present.

9. The method according to claim 7, wherein the determining a presence of a network comprises:
selecting from an ordered list of possible networks present, a first network to search for;
searching for a presence of the first network; and
searching for, in response to not finding the presence of the first network, a second network from the ordered list.

10. The method according to claim 7, wherein the selected emergency services connection profile comprises at least one of:
an instruction to block incoming calls;
an instruction to redial failed call attempts; and
an instruction to classify an input number as an emergency service request.

11. The method according to claim 7, wherein:
each of the profiles comprises a selection of an operation of one of a plurality of modems and each of the plurality of modems corresponds to a different wireless network type.

12. The wireless communication device according to claim 7, further comprising:
accepting a user input; and
using the user input to define one or more of the plurality of profiles.

13. A computer program product for wirelessly accessing emergency services, the computer program product comprising a non-transitory, tangible storage medium readable by a processing circuit in a wireless communication device and storing instructions for execution by the processing circuit for performing a method comprising:
receiving from a user, via a user interface, a destination calling number;
comparing the received destination calling number with at least one number stored in memory;
determining if the received destination calling number matches a number stored in the memory and defined as an emergency contact number associated with one of a plurality of emergency service connection profiles;
determining a presence of a network providing wireless communication service;

selecting, based on the network determined to be present, one of a the plurality of emergency service connection profiles, wherein each emergency service connection profile indicates at least one wireless communication capability supported by a network associated therewith at least during an emergency service connection;

sending a request for emergency service connection to the network determined to be present; and presenting a representation of the matching one of the plurality of emergency service connection profiles to the user via the user interface while contemporaneously following the selected one of the plurality of emergency service connection profiles to obtain an emergency service connection based on the network determined to be present; and wherein the matching one of the plurality of emergency service connection profiles is different from the selected one of the emergency service connection profiles.

14. The computer program product according to claim 13, the method further comprising:

determining a type of the network service determined to be present; and selecting the emergency service connection profile based on the type of network service determined to be present.

15. The computer program product according to claim 13, wherein the determining a presence of a network service comprises:

selecting from an ordered list of possible networks present, a first network to search for;

searching for a presence of the first network; and searching for, in response to not finding the presence of the first network, a second network from the ordered list.

16. The computer program product according to claim 13, wherein the profile comprises at least one of:

an instruction to block incoming calls;

an instruction to redial failed call attempts;

an instruction to classify an input number as an emergency service request.

17. The computer program product according to claim 13, wherein:

each of the profiles comprises a selection of an operation of one of a plurality of modems and each of the plurality of modems corresponds to a different wireless network type.

18. The wireless communication device of claim 1, wherein presenting a representation of any of the plurality of emergency service connection profiles via the user interface to a user of the wireless communication device as a single emergency call model that is uniform among the profiles further comprises:

determining that the network determined to be present fails to provide at least one wireless communication capability that is provided by at least one other network as indicated by the plurality of emergency service connection profiles; and providing the at least one wireless communication capability to the user on the network determined to be present.

19. The wireless communication device of claim 1, wherein in response to receiving a destination calling number matching a particular Enhanced 911 emergency service connection profile, the processor presents a representation of the particular Enhanced 911 emergency service connection profile via the user interface while the emergency service selector contemporaneously selecting another one of the plurality of emergency service connection profiles, different than the particular Enhanced 911 emergency service connection profile, based on the network determined to be present.

20. The method of claim 7, wherein in response to receiving a destination calling number matching a particular Enhanced 911 emergency service connection profile, presenting a representation of the particular Enhanced 911 emergency service connection profile via the user interface while contemporaneously selecting and following another one of the plurality of emergency service connection profiles, different than the particular Enhanced 911 emergency service connection profile, based on the network determined to be present.

* * * * *